United States Patent [19]

Razdan et al.

[11] 3,917,617
[45] Nov. 4, 1975

[54] 1-[2,6-DIHYDROXY-4-HYDROCARBYL-BENZOYL]POLYMETHYLENEIMINES AND DERIVATIVES

[75] Inventors: Raj Kumar Razdan, Belmont; Harry George Pars, Lexington, both of Mass.

[73] Assignee: Sharps Associates, Cambridge, Mass.

[22] Filed: Oct. 1, 1973

[21] Appl. No.: 402,480

[52] U.S. Cl.... 260/293.77; 260/239 B; 260/239 BF; 260/247.2 B; 260/247.7 A; 260/247.7 C; 260/243 B; 260/268 C; 260/326.41; 260/326.5 E; 260/479 R; 260/521 R; 260/544 M; 260/559 S; 260/613 D; 260/621 K; 260/625; 424/244; 424/246; 424/248; 424/250; 424/267; 424/274; 424/311; 424/324

[51] Int. Cl.².......................................... C07D 295/16
[58] Field of Search..... 260/239 B, 239 BF, 293.77, 260/326.77, 326.41, 326.5 E

[56] References Cited
UNITED STATES PATENTS
3,817,999   6/1974   Clemence et al. ........... 260/326.5 E

*Primary Examiner*—Sherman D. Winters
*Attorney, Agent, or Firm*—Merriam, Marshall, Shapiro & Klose

[57] ABSTRACT

Compounds of the formula

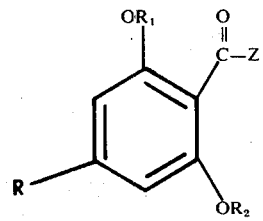

and acid addition salts thereof, wherein R represents an alkyl group having 1 to 20 carbon atoms, an arylalkyl group, or a cycloalkyl-lower alkyl group, $R_1$ and $R_2$ represent hydrogen or the same or different lower alkyl or lower alkanoyl groups; and Z represents $-NH_2$, $-NHR_3$, $-NR_3R_4$, or

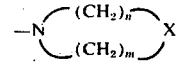

where $R_3$ is lower alkyl or phenyl-lower alkyl, $R_4$ is lower alkyl or phenyl-lower alkyl, m is an integer from 0 to 6, n is an integer from 0 to 6, m + n is an integer from 3 to 6, and X is $CH_2$, $CHR_3$, O, S, or $NR_3$.

The compounds have pharmacological activity, including analgesic, antidepressant and antihypertensive activity, in animals.

3 Claims, No Drawings

1-[2,6-DIHYDROXY-4-HYDROCARBYL-BENZOYL]POLYMETHYLENEIMINES AND DERIVATIVES

This invention relates to novel chemical compounds and processes of producing the same. More particularly this invention is concerned with novel resorcinol derivatives and the use of such compounds, particularly those having pharmacological activity.

In accordance with the invention there are provided novel resorcinol derivatives having the formula

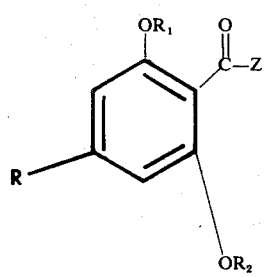

Formula 1 wherein R represents an alkyl group having 1 to 20 carbon atoms, an arylalkyl group, or a cycloalkyl-lower alkyl group;

$R_1$ and $R_2$ represent hydrogen or the same or different lower alkyl or lower alkanoyl groups; and Z represents $-NH_2$, $-NHR_3$, $-NR_3R_4$, or

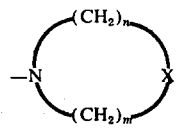

where $R_3$ is lower alkyl or phenyl-lower alkyl, $R_4$ is lower alkyl or phenyl-lower alkyl, m is an integer from 0 to 6, n is an integer from 0 to 6, $m + n$ is an integer from 3 to 6, and X is $CH_2$, $CHR_3$, O, S, or $NR_3$.

As used herein, the term "lower alkyl" means saturated, monovalent aliphatic-radicals, including straight and branched chain radicals of from one to six carbon atoms, as illustrated by, but not limited to methyl, ethyl, propyl, isopropyl, butyl, sec.-butyl, amyl hexyl, and the like.

As used herein, the term "alkyl" means saturated, monovalent aliphatic radicals, including straight and branched-chain radicals having one to twenty carbon atoms, as illustrated by, but not limited to methyl, n-amyl, n-hexyl, 2-heptyl, n-heptyl, 3-methyl-2-octyl, n-octyl, 2-nonyl, 2-tetradecyl, n-hexadecyl, 2-eicosanyl, and the like.

The term "arylalkyl" means groups having an aryl group joined to an alkyl, and particularly a lower alkyl, group. The aryl group can have a single ring, such as the phenyl group, or a plurality of unsaturated rings which can be bonded together or which can be fused rings as in the naphthyl group.

As used herein, the term "cycloalkyl" means cyclic, saturated aliphatic-radicals having three to eight carbon atoms, as illustrated by but not limited to cyclopropyl, cyclobutyl, 2-methylcyclobutyl, cyclohexyl, 4-methylcyclohexyl, cyclooctyl, and the like.

As used herein, the term "lower alkanoyl" means saturated, monovalent, aliphatic radicals, derived from a monocarboxylic acid, including straight or branched-chain radicals, of from one to six carbon atoms, as illustrated by, but not limited to formyl, acetyl, propionyl, α-methyl-propionyl, butyryl, hexanoyl, and the like.

As used herein, the term "phenyl-lower alkyl", means a monovalent radical consisting of a phenyl nucleus bonded to the rest of the molecule through a divalent lower-alkylene radical of from one to four carbon atoms, as illustrated by, but not limited to, methylene, 1,1-ethylene, 1,2-ethylene, 1,3-propylene, 1,2-propylene, 1,4-butylene, and the like. Here and elsewhere throughout the specification, it will be understood that the benzene or phenyl ring can bear any number and kind of substituents, such as will occur to one skilled in organic chemistry. Solely for illustration, and without limitation, such substituents include lower alkyl, lower alkoxy, halo (chloro, bromo, iodo, or fluoro), nitro, lower-alkylmercapto and the like.

The compounds of Formula 1 can generally be prepared by reacting a compound of Formula 2

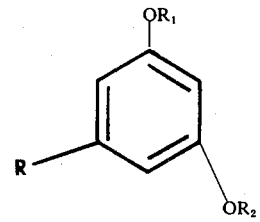

Formula 2 with butyl lithium and carbon dioxide, in accordance with a known procedure, to form the corresponding substituted benzoic acid (Formula 3):

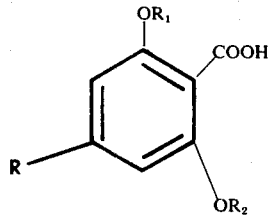

Formula 3

This reaction is suitably carried out by dissolving the compound of Formula 2 in a suitable solvent, such as dry ether, and adding the solution slowly under an inert blanket (e.g., nitrogen) at low temperature to a solution of butyl lithium in hexane and dry ether. The reaction mixture is refluxed for an extended period, cooled, and then reacted with a stream of carbon dioxide passed through the mixture. After acidification with HCl, the desired product is extracted with ether and purified in conventional fashion.

The compound of Formula 3 is then reacted with thionyl chloride (or other equivalent reagent) under conditions suitable for forming the acid chloride of the substituted benzoic acid (Formula 4)

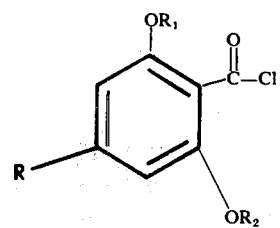

Formula 4

After removal of excess thionyl chloride, the compound of Formula 4 is then dissolved in a suitable solvent, such as benzene, and reacted with HZ, where Z has the significance previously assigned, to form a compound of Formula 1.

In preparing compounds of Formula 1 by the method described above, R, $R_1$, and $R_2$ can have the significance previously assigned, except that in the compound of Formula 2 $R_1$ and $R_2$ should not be hydrogen, which might react with butyl lithium and carbon dioxide to give undesirable by-products. If a compound in which $R_1$ and $R_2$ are hydrogen is desired, it can be prepared by using as a starting reactant (Formula 2) a corresponding compound in which $R_1$ and $R_2$ are relatively non-reactive groups, such as methyl, to produce a methoxy-substituted compound. The final product can then be hydrolyzed in conventional fashion to substitute hydrogen atoms for the methyl groups.

Some of the starting reactants of Formula 2 which can be used include:
1,3-dimethoxy-5-(3-methyl-2-octyl) benzene
1,3-diethoxy-5-(6-cyclopentylhexyl) benzene
1,3-dimethoxy-5-pentyl benzene
1,3-diethoxy-5-(4-cyclohexylbutyl) benzene
1,3-dimethoxy-5-cyclohexyl benzene
1-ethoxy-3-methoxy-5-pentyl benzene Some of the reactants of formula HZ which can be used include:
ammonia
methylamine, ethylamine and other lower alkylamines
dimethylamine, methylethylamine, and other di-(lower alkyl)amines
N-methylphenethyl amine
pyrrolidine
piperidine
homopiperidine
morpholine
2-, 3-, or 4-pipecoline and other lower alkyl substituted piperazines
p-thiazine.
1-methyl piperazine Some of the compounds of Formula 1 which can be produced as described are:
1-[2,6-dimethoxy-4-(3-methyl-2-octyl)benzoyl]-piperidine
2,6-dimethoxy-4-pentyl-benzamide
1-[2,6-dimethoxy-4-(4-cyclohexylbutyl)benzoyl] piperidine
1-[2,6-diethoxy-4-(6-cyclopentylhexyl)benzoyl] morpholine
1-(2-ethoxy-6-methoxy-4-pentyl benzoyl)pyrrolidine
1-[2,6-dimethoxy-4-(3-methyl-2-octyl)benzoyl]-4-methylpiperazine Acid addition salts, e.g. 1-[2,6-dihydroxy-4-(3-methyl-2-octyl)benzoyl]piperidine hydrochloride can readily be made by contacting a compound of Formula 1 with a suitable organic or inorganic acid, such as citric acid, tartaric acid, succinic acid, benzoic acid, hydrochloric acid, or sulfuric acid, in the presence of a solvent such as acetone, benzene, ethanol, or ether.

The compounds of Formula 1 exhibit a variety of pharmacological properties which make them useful for the treatment of various disorders in animals. For example, the compound of Example 1 has analgesic, antibacterial, antifungal, and antidepressant properties. In addition, the compounds of the invention are basic, so that they can be used as neutralizing agents in various chemical reactions.

For pharmaceutical use, the amount of active ingredient administered to an animal may be varied; however, it is necessary that the amount of active ingredient be such that a suitable dosage is given. The selected dosage depends upon the desired therapeutic effect, on the route of administration and on the duration of treatment. Dosages of about 5–50 mg./kg. of body weight daily, preferably in divided doses, i.e., three to four times daily, can be administered.

The active agents of this invention can be administered to animals, including humans, as pure compounds. It is advisable, however, to first combine one or more of the compounds with a suitable pharmaceutical carrier to attain a satisfactory size to dosage relationship and thereby obtain a pharmaceutical composition.

Pharmaceutical carriers which are liquid or solid can be used. Solid carriers such as starch, sugar, talc and the like can be used to form powders. The powders can be used for direct administration or they may be used to make tablets or to fill gelatin capsules. Suitable lubricants like magnesium stearate, binders such as gelatin, and disintegrating agents like sodium carbonate in combination with citric acid can be used to form tablets. Sweetening and flavoring agents can also be included.

Unit dosage forms such as tablets and capsules can contain any suitable predetermined amount of one or more of the active agents, and they may be administered one or more at a time at regular intervals. Such unit dosage forms, however, should generally contain a concentration of 0.1 to 50 percent by weight of one or more of the active compounds. Unit dosage forms, such as tablets and capsules, can contain about 5 to 300 mg. of active agent.

| A typical tablet can have the composition: | |
|---|---|
| | Mg |
| Active agent* | 100 |
| Starch U.S.P. | 57 |
| Lactose U.S.P. | 73 |
| Talc. U.S.P. | 9 |
| Stearic acid | 12 |

*e.g., the compound of Example 1.

The compounds of this invention exhibit both oral and parenteral activity and accordingly can be formulated in dosage forms for either oral or parenteral administration to a patient.

Solid dosage forms for oral administration include capsules, tablets, pills, powders, granules and the like.

Liquid dosage forms for oral administration include emulsions, solutions, suspensions, syrups and the like, containing diluents commonly used in the art such as water. Besides inert diluents, such preparations can also include adjuvants such as wetting agents, emulsifying and suspending agents and sweetening, flavoring and perfuming agents.

Preparations for parenteral administration include sterile aqueous or non-aqueous solutions. Examples of nonaqueous solvents or vehicles are propylene glycol, polyethylene glycol, vegetable oils such as olive oil and injectable organic esters such as ethyl oleate. The parenteral preparations are sterilized by conventional methods.

The following examples are presented to further illustrate the invention.

EXAMPLE 1

1-[2,6-Dimethoxy-4-(3-methyl-2-octyl)benzoyl]piperidine

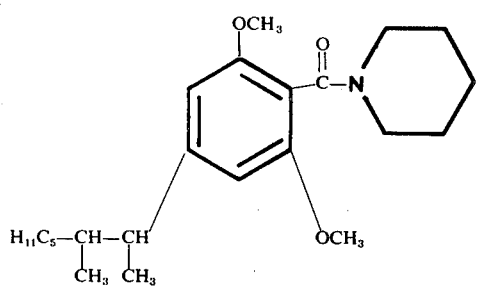

A solution of 26.4 g (0.1 mole) of 1,3-dimethoxy-5-(3-methyl-2-octyl) benzene in 30 ml of dry ether was added dropwise under nitrogen at 0°C to a solution of 45 ml of 22 percent butyl lithium/hexane in 30 ml of dry ether. The mixture was refluxed under nitrogen for 20 hr. After cooling, dry carbon dioxide gas was bubbled through the reaction mixture. Towards the end a few chunks of dry ice and some dry ether were added. The mixture was carefully acidified with 6N hydrochloric acid and the mixture was extracted with ether. The ether solution was extracted with 3N sodium hydroxide solution and the basic aqueous layer was carefully acidified with 6N hydrochloric acid. The acid solution was extracted with ether which was washed, dried and evaporated to leave an oily residue. On tituration with petroleum ether a solid was obtained which was recrystallized from petroleum ether to yield 10 g (33 percent) of 2,6-dimethoxy-5-(3-methyl-2-octyl)benzoic acid, m.p. 127°–130°C. A solution of 1 g (0.033 mole) of the acid in 5 ml of thionyl chloride was heated under reflux for 1.5 hr. The solution was concentrated on a rotary evaporator and the last traces of thionyl chloride were removed by addition and evaporation of 20 ml of benzene on a rotary evaporator. The acid chloride thus obtained was dissolved in 20 ml of benzene and a solution of 0.85 g (0.1 mole) of piperidine in 15 ml of benzene was added slowly with ice cooling. The mixture was allowed to stand overnight at room temperature and then heated on a steam bath for 2 hours. After cooling, the mixture was decomposed by addition of water followed with excess 6N hydrochloric acid solution. The benzene layer was separated and the aqueous layer was extracted with ether. The combined organic layers were washed with sodium bicarbonate solution followed with water until neutral. After drying, the solvent was evaporated to leave a gum which was chromatographed on 50 g of activated magnesium silicate in chloroform and eluted with 1 percent and 3 percent methanol/-chloroform solvent mixtures. Fractions, which showed a single spot on thin layer chromatography (5 percent methanol/chloroform) were combined and evaporated to leave 0.84 g (69 percent) of a gum; the infrared spectra was in agreement with the proposed structure. Analysis: Calculated for $C_{23}H_{37}NO_3H_2O$ (MW = 393.53). C, 70.2; H, 9.92; N, 3.56. Found: C, 70.34; H, 9.47; N, 3.56.

EXAMPLE 2

2,6-Dimethoxy-4-pentylbenzamide

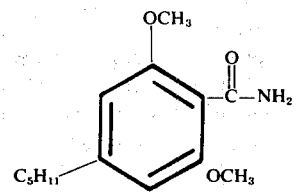

Using the procedure of Example 1, 2,6-dimethoxy-4-pentylbenzoyl chloride is reacted with ammonia to obtain 2,6-dimethoxy-4-pentyl-benzamide.

EXAMPLE 3

1-(2,6-diethoxy-4-pentylbenzoyl)morpholine

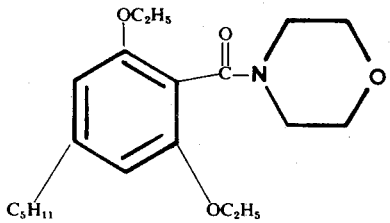

Using the procedure of Example 1, 2,6-diethoxy-4-pentylbenzoyl chloride is reacted with morpholine to obtain 1-(2,6-diethoxy-4-pentylbenzoyl)morpholine.

EXAMPLE 4

1-[2,6-Dimethoxy-4-(3-methyl-2-octyl)benzoyl]-4-methylpiperazine

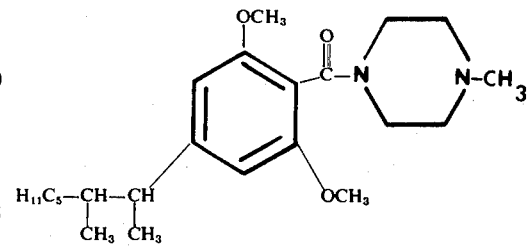

Using the procedure of Example 1, 2,6-dimethoxy-4-(3-methyl-2-octyl)benzoyl chloride is reacted with N-methyl piperazine to obtain 1-[2,6-dimethoxy-4-(3-methyl-2-octyl)benzoyl]-4-methylpiperazine.

The foregoing detailed description has been given for clearness of understanding only, and no unnecessary limitations should be understood therefrom, as modifications will be obvious to those skilled in the art.

We claim:

1. A compound of the group consisting of compounds of the formula

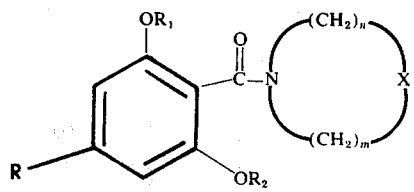

and non-toxic pharmacologically acceptable acid addition salts thereof, wherein R represents an alkyl group having 1 to 20 carbon atoms, a phenyl-lower alkyl group, or a cycloalkyl-lower alkyl group in which the cycloalkyl moiety contains 3 to 8 carbon atoms;

$R_1$ and $R_2$ represent hydrogen or the same or different lower alkyl or lower alkanoyl groups;

m is an integer from 0 to 6, n is an integer from 0 to 6, $m + n$ is an integer from 3 to 6, X is $CH_2$ or $CHR_3$; and $R_3$ is lower alkyl or phenyl-lower alkyl.

2. A compound according to claim 1 in which X is $CH_2$, m + n equals an integer from 3 to 4, R is an alkyl group having 5 to 10 carbon atoms, $R_1$ is hydrogen or methyl and $R_2$ is hydrogen or methyl.

3. A compound according to claim 2 named 1-[2,6-dimethoxy-4-(3-methyl-2-octyl)benzoyl]piperidine.

* * * * *